United States Patent [19]  
Lo et al.

[11] Patent Number: 4,677,087  
[45] Date of Patent: Jun. 30, 1987

[54] CATALYST COMPOSITION FOR POLYMERIZING ALPHA-OLEFIN POLYMERS OF RELATIVELY NARROW MOLECULAR WEIGHT DISTRIBUTION

[75] Inventors: Frederick Y. Lo, Yanbu Al Sinaiyah, Saudi Arabia; Thomas E. Nowlin, Somerset; Margaret M. Wu, Belle Mead, both of N.J.

[73] Assignee: Mobil Oil Corporation, New York, N.Y.

[21] Appl. No.: 816,091

[22] Filed: Jan. 3, 1986

[51] Int. Cl.$^4$ .......................... C08F 4/62; C08F 4/64; C08F 4/68

[52] U.S. Cl. ................................ 502/104; 502/103; 502/120; 502/126; 502/132; 502/115; 526/129; 526/142; 526/156

[58] Field of Search ............... 502/103, 104, 120, 126, 502/132, 115

[56] References Cited

U.S. PATENT DOCUMENTS

| | | | |
|---|---|---|---|
| 3,135,809 | 6/1964 | Bosmajian | 502/103 X |
| 3,787,384 | 1/1974 | Stevens et al. | 260/94.9 DA |
| 4,063,009 | 12/1977 | Ziegler, deceased et al. | 526/159 |
| 4,076,698 | 2/1978 | Anderson et al. | 526/348.6 |
| 4,148,754 | 4/1979 | Strobel | 252/429 C |
| 4,173,547 | 11/1979 | Graff | 252/429 C X |
| 4,302,566 | 11/1981 | Karol et al. | 526/125 |
| 4,378,304 | 3/1983 | Dombro | 502/120 X |
| 4,481,301 | 11/1984 | Nowlin et al. | 502/104 |
| 4,558,024 | 12/1985 | Best | 502/115 |
| 4,558,025 | 12/1985 | Best | 502/115 |
| 4,579,834 | 4/1986 | Best | 502/115 |

FOREIGN PATENT DOCUMENTS 1915792 10/1985 Canada.  
0081940 6/1983 European Pat. Off..  
82/8776 7/1984 South Africa.

OTHER PUBLICATIONS

W. L. Carrick, *Journal of American Chemical Society*, vol. 80, pp. 6455–6456, (1958).  
W. L. Carrick et al, *Journal of American Chemical Society*, vol. 83, pp. 2654–2658, (1961).

*Primary Examiner*—Patrick P. Garvin  
*Attorney, Agent, or Firm*—Alexander J. McKillop; Michael G. Gilman; Stanislaus Aksman

[57] ABSTRACT

A catalyst composition for polymerizing alpha-olefins is prepared by treating a carrier containing OH groups with a liquid solution containing an excess of an organomagnesium composition with respect to the OH groups and contacting the thus-formed magnesium-containing carrier with a solution of at least one transition metal compound. Prior to contacting the magnesium-containing carrier with the transition metal compound, most of the liquid must be removed therefrom, so that it comprises not more than about 6% of the liquid. The amount of the transition metal compound is such that the molar ratio of the transition metal to magnesium in the reaction mixture is about 0.3 to about 0.9. Also disclosed is a process for polymerizing alpha-olefins in the presence of the catalyst of the invention.

52 Claims, 2 Drawing Figures

CATALYST COMPOSITION FOR POLYMERIZING ALPHA-OLEFIN POLYMERS OF RELATIVELY NARROW MOLECULAR WEIGHT DISTRIBUTION

BACKGROUND OF THE INVENTION

1. Field of the Invention

The present invention relates to a method for polymerizing alpha-olefins, a catalyst for such a polymerization method and a method for producing such a catalyst. A particular aspect of the present invention relates to a method for preparing a catalyst which produces linear low density polyethylene (LLDPE) having a relatively narrow molecular weight distribution, as evidenced by relatively low values of melt flow ratios (MFR), suitable for film and injection molding applications.

2. Description of the Prior Art

Linear low density polyethylene polymers possess properties which distinguish them from other polyethylene polymers, such as homopolymers of polyethylene. Certain of these properties are described in Anderson et al, U.S. Pat. No. 4,076,698.

Karol et al, U.S. Pat. No. 4,302,566, describe a process for producing certain linear low density polyethylene polymers in a gas phase, fluid bed reactor.

Graff, U.S. Pat. No. 4,173,547, Stevens et al, U.S. Pat. No. 3,787,384, Strobel et al, U.S. Pat. No. 4,148,754, and Ziegler, deceased, et al, U.S. Pat. No. 4,063,009, each describe various polymerization processes suitable for producing forms of polyethylene other than linear low density polyethylene, per se.

Graff, U.S. Pat. No. 4,173,547, describes a supported catalyst obtained by treating a support with both an organoaluminum compound and an organomagnesium compound followed by contacting this treated support with a tetravalent titanium compound.

Stevens et al, U.S. Pat. No. 3,787,384, and Strobel et al, U.S. Pat. No. 4,148,754, describe a catalyst prepared by first reacting a support (e.g., silica containing reactive hydroxyl groups) with an organomagnesium compound (e.g., a Grignard reagent) and then combining this reacted support with a tetravalent titanium compound. According to the teachings of both of these patents, no unreacted organomagnesium compound is present when the reacted support is contacted with the tetravalent titanium compound.

Ziegler, deceased, et al, U.S. Pat. No. 4,063,009, describe a catalyst which is the reaction product of an organomagnesium compound (e.g., an alkylmagnesium halide) with a tetravalent titanium compound. The reaction of the organomagnesium compound with the tetravalent titanium compound takes place in the absence of a support material.

A vanadium-containing catalyst, used in conjunction with triisobutylaluminum as a co-catalyst, is disclosed by W. L. Carrick et al in *Journal of American Chemical Society*, Volume 82, page 1502 (1960) and Volume 83, page 2654 (1961).

Nowlin et al, U.S. Pat. No. 4,481,301, the entire contents of which are incorporated herein by reference, disclose a supported alpha-olefin polymerization catalyst composition prepared by reacting a support containing OH groups with a stoichiometric excess of an organomagnesium composition, with respect to the OH groups content, and then reacting the product with a tetravalent titanium compound.

It is a primary object of the present invention to prepare a high activity catalyst for the polymerization of alpha-olefins which yields products of a relatively narrow molecular weight distribution suitable for films and injection molding applications.

It is an additional object of the present invention to provide a catalytic process for polymerizing alpha-olefins which yields linear low density polyethylene of a relatively narrow molecular weight distribution.

SUMMARY OF THE INVENTION

A supported alpha-olefin polymerization catalyst composition of this invention is prepared in a multi-step process. In the first step, a solid, porous carrier having reactive OH groups is contacted with a liquid containing at least one organomagnesium composition of the empirical formula $$R_nMgR'_{(2-n)}$$

where R and R' are the same or different and they are $C_1$–$C_{12}$ hydrocarbyl groups provided that R' may also be a halogen and n is 0, 1 or 2. The number of moles of the organomagnesium composition is in excess of the number of moles of the reactive OH groups on the carrier. In the second step, the liquid is carefully evaporated to assure that none or very little of magnesium-containing compound(s) is removed from the raction mixture and that most, if not all, of the magnesium-containing compound(s) are retained on the carrier. The product of this step is a solid supported magnesium (Mg) composition.

Subsequently, the product is dried, in the third step until it comprises not more than about 6% by weight of the liquid. The product of this step is a dry, free-flowing powder.

In the fourth synthesis step, the powder is reacted with a solution of at least one transition metal compound, soluble in non-polar solvents, in a non-polar solvent. The amount of the transition metal compound used in this step is such that the molar ratio of the transition metal to magnesium (Mg) in the reaction mixture of this step is about 0.3 to about 0.9, both the transition metal and Mg being calculated as elemental metals. The supported magnesium composition is substantially insoluble in the non-polar solvent. Accordingly, a reacted form of transition metal insoluble in the non-polar solvent becomes supported on the carrier.

The invention is also directed to an alpha-olefin polymerization process conducted in the presence of the catalyst of this invention.

DETAILED DESCRIPTION OF THE INVENTION

The polymers prepared in the presence of the catalyst compositions of this invention are linear polyethylenes which are homopolymers of ethylene or copolymers of ethylene and higher alpha-olefins. The polymers exhibit relatively high values of melt index ($I_2$) and relatively low values of melt flow ratio (MFR), as compared to similar polymers prepared in the presence of similar, previously-known catalyst compositions, e.g., those disclosed by Nowlin et al, U.S. Pat. No. 4,481,301. Thus, the polymers prepared with the catalyst compositions of this invention are especially suitable for the production of films and injection molding applications.

Catalysts produced according to the present invention are described below in terms of the manner in which they are made.

Suitable carrier materials, organomagnesium compositions, liquids, and the manner of using thereof in the first step of the catalyst synthesis process are those disclosed by Nowlin et al, U.S. Pat. No. 4,481,301. Accordingly, only the most important features of such materials and of the manner of conducting the first catalyst synthesis step will be discussed herein.

The carrier materials have the form of particles having a particle size of from about 0.1 micron to about 200 microns, more preferably from about 10 to about 150 microns. Preferably, the carrier is in the form of spherical particles, e.g., spray dried silica. The internal porosity of the carriers is larger than 0.2 cm$^3$/gm, preferably larger than about 0.6 cm$^3$/gm. The specific surface area of the carriers is larger than about 50 m$^2$/gm, preferably from about 150 to about 1500 m$^2$/gm. In the most preferred embodiment, the carrier is silica which has been dehydrated by fluidizing with nitrogen and heating at about 800° C. for about 16 hours to achieve a surface hydroxyl concentration of about 0.4 mmols/gm. The silica of the most preferred embodiment is a high surface area, amorphous silica (surface area = 300 m$^2$/gm; pore volume of 1.65 cm$^3$ per gram), and it is a material marketed under the tradename of Davison 952 or Davison 955 by the Davison Chemical Division of W. R. Grace and Company. The silica is in the form of spherical particles, e.g., as obtained by a spray-drying process.

Chemically bound water, e.g., as represented by the presence of the OH groups in the carrier, may be present when the carrier is contacted with water-reactive organomagnesium compounds in accordance with the present invention. Excess OH groups present in the carrier may be removed by heating the carrier, prior to the contacting step, for a sufficient time at a sufficient temperature to accomplish the desired degree of the OH groups removal. A relatively small number of OH groups is removed by sufficient heating at from about 150° C. to about 250° C., whereas a relatively large number of OH groups may be removed by sufficient heating at at least 500° or 600° C., preferably from about 750° C. to about 850° C. The heating is continued for about 4 to about 16 hours. The amount of the hydroxyl groups in silica may be determined according to the method disclosed by J. B. Peri and A. L. Hensley, Jr., in *J. Phys. Chem.*, 72 (8), 2926 (1968), the entire contents of which are incorporated herein by reference.

While heating is the most preferred means of removing OH groups inherently present in many carriers, such as silica, the OH groups may also be removed by other removal means, such as chemical means. For example, a desired proportion of OH groups may be reacted with a suitable chemical agent, such as a hydroxyl reactive aluminum compound, e.g., triethylaluminum.

A dehydrated carrier material is treated with a solution of a solid organomagnesium composition in a liquid, the organomagnesium composition being capable of reacting with a transition metal compound soluble in non-polar solvents. In a preferred embodiment, the carrier material is admixed with a hydrocarbon, preferably a saturated hydrocarbon, such as hexane or isopentane, and the resulting suspension of the carrier is vigorously stirred before it is contacted with the solution of the organomagnesium composition in the liquid. In this preferred embodiment, the carrier suspension is continuously stirred while the solution of the organomagnesium composition is added thereto. After the addition is completed, the solution is refluxed for about 0.1 to about 10, preferably about 0.5 to about 5, and most preferably about 1.0 to about 2.0 hours at a temperature of about 25 to about 200, preferably about 50 to about 100, and most preferably about 60° to about 80° C. The organomagnesium composition has the empirical formula $R_nMgR'_{(2-n)}$, where R and R' are the same or different and they are $C_1-C_{12}$ hydrocarbyl groups, preferably $C_1-C_{12}$ alkyl groups, more preferably $C_1-C_{12}$ unsubstituted alkyl groups, yet more preferably $C_1-C_4$ alkane groups and most preferably $C_2-C_4$ alkane groups, provided that R' may also be a halogen, and n is 0, 1 or 2. If R' is a halogen, it is preferably chlorine, bromine or iodine, and most preferably chorine. In the preferred embodiment, a solution of such an organomagnesium composition is a Grignard reagent and the carrier material is contacted with the solution thereof in the absence of ball milling.

Preferably, the carrier is treated with the aforementioned solution in such a manner that, after the treatment is completed, the carrier has magnesium incorporated into the pores thereof. As used herein, the concept of incorporating a material onto a carrier is intended to encompass the incorporation of the material (e.g., magnesium or titanium compositions) onto the carrier by physical or chemical means. Accordingly, the incorporated material need not necessarily be chemically bound to the carrier. As a result of this treatment, magnesium becomes incorporated into the pores of the carrier by chemical or physical means. More particularly, the magnesium is incorporated into the pores of the carrier by: (1) a chemical reaction of the organomagnesium composition with the carrier, by (2) a precipitation of magnesium from the organomagnesium composition onto the carrier or (3) a combination of such a reaction and precipitation.

Suitable liquids which are solvents for Grignard reagents are ethers, such as aliphatic ethers, e.g., diethyl ether, diisopropyl ether, dibutyl ether, dipentyl ether, and ethyl-n-butyl ether and cyclic ethers, such as tetrahydrofuran and dioxane. Thus, the liquid medium containing the organomagnesium composition is usually an ether, preferably tetrahydrofuran.

It is important for the purposes of the present invention that the number of moles of the organomagnesium compositon in the solution used to contact the carrier be in excess of the number of moles of the OH groups on the carrier, so that the molar ratio of the organomagnesium composition in the solution to the hydroxyl groups is greater than 1.0, preferably it is from about 1.1 to about 3.5, more preferably from about 1.5 to about 3.5, and most preferably from about 2.0 to about 3.5.

It is also important for the purposes of the present invention, that the number of moles of the sum of all magnesium-containing compounds on the carrier, in the product of the second and third steps of the catalyst synthesis of this invention, be in excess of the number of moles of the OH groups originally present on the carrier, prior to the contact of the carrier with the liquid containing the organomagnesium composition. The molar ratio of the sum of all magnesium-containing compounds in the product of the second and third steps to the aforementioned OH groups is greater than 1, preferably it is from about 1.1 to about 3.5, more preferably about 1.5 to about 3.5, and most preferably from about 2.0 to about 3.5.

To assure that most, if not all, of the magnesium-containing compound(s) are retained on the carrier, the liquid is removed from the reaction vessel with care to assure that none or very little magnesium-containing compound(s) are removed with it. The liquid may be removed by any means assuring that substantially all of the magnesium-containing compound(s) remain on the carrier, e.g., by distillation of the mixture of the impregnated carrier and the solvents, evaporation, decantation or centrifugation. Evaporation at about the boiling point of the liquid is the most preferred method of liquid removal. It is also important that the product of the second and third reaction steps is not subjected to washing or rinsing, so that the excess of the magnesium-containing compound or compounds which did not react with the hydroxyl (OH) groups of the carrier is retained on the carrier.

After the liquid is removed, the resulting product is dried, in the third synthesis step, by any conventional means, e.g., drying at ambient temperature or at 50°–80° C. for about 12–16 hours with a stream of dry nitrogen to produce a dry, free-flowing powder. the drying step is conducted until the resulting dry, free-flowing powder comprises not more than about 6% by weight, preferably not more then about 5%, and most preferably about 2% to about 5% by weight of the liquid used to dissolve the organomagnesium composition prior to the addition thereof to the silica in step (i) of the synthesis. Without wishing to be bound by any theory of operability, it is believed that the presence of higher amounts of the liquid or solvent in the dry, free-flowing powder causes the resulting catalyst composition to produce polymers having undesirably high densities.

The amount of magnesium-containing compound(s) which is incorporated onto the carrier should be sufficient to react with the transition metal, in order to incorporate a catalytically effective amount of transition metal on the carrier in the manner set forth hereinbelow. Thus, the carrier should comprise from about 0.1 to about 50, preferably about 0.1 to about 5 millimoles (mmoles) of magnesium per gram of carrier (after the treatment of the carrier with the organomagnesium composition is completed). When the liquid containing the organomagnesium composition is contacted with the carrier, the amount of magnesium in this liquid is substantially the same as that stated above which is incorporated onto the carrier.

The free-flowing powder obtained in the third step is reacted with at least one transition metal compound dissolved in a non-polar solvent (also referred to herein as a liquid medium diluent). The transition metal compound is soluble in this solvent, while the treated carrier (i.e., the free-flowing powder), including the magnesium-containing compound(s), is insoluble therein. Thus, the reaction which takes place between transition metal and the reactive magnesium-containing compound(s) is a reaction of a solid with a liquid. It is further noted that the reacted transition metal is insoluble in the solvent.

Without wishing to be bound by any theory of operability, it is thought that the reaction which takes place between the magnesium compound which is not a reaction product of an organomagnesium composition with the carrier and the transition metal in the liquid reaction medium is substantially an oxidation/reduction reaction, wherein the magnesium compound acts as a reducing agent for the transition metal. On the other hand, while not wishing to be bound by any particular theory or chemical mechanism, the reaction which takes place between (1) the transition metal and (2) the reaction product of an organomagnesium composition and carrier containing reactive OH groups is not an oxidation/reduction reaction. However, it is noted that both of the above-mentioned reactions lead to the incorporation of transition metal onto the carrier.

Suitable transition metal compounds used herein are compounds of metals of Groups IVA, VA, VIA or VIII of the Periodic Chart of the Elements, as published by the Fisher Scientific Company, Catalog No. 5-702-10, 1978, providing that such compounds are soluble in non-polar solvents. Non-limiting examples of such compounds are titanium and vanadium halides, e.g., titanium tetrachloride, $TiCl_4$, vanadium tetrachloride, $VCl_4$, vanadium oxytrichloride, $VOCl_3$, titanium tetrabromide, $TiBr_4$, titanium and vanadium alkoxides, wherein the alkoxide moiety has a branched or unbranched alkyl radical of 1 to about 20 carbon atoms, preferably 1 to about 6 carbon atoms. The preferred transition metal compounds are titanium compounds, preferably tetravalent titanium compounds. The most preferred titanium compound is titanium tetrachloride.

Mixtures of such transition metal compounds may also be used and generally no restrictions are imposed on the transition metal compounds which may be included. Any transition metal compound that may be used alone may also be used in conjunction with other transition metal compounds.

Suitable liquid medium diluents are materials in which the transition metal compounds are at least partially soluble and which are liquid at reaction temperatures. Preferred diluents are alkanes, such as hexane, n-heptane, octance, nonane, and decane, although a variety of other materials including cycloalkanes, such as cyclohexane, aromatics, such as benzene and ethylbenzene, and halogenated aromatics, such as chlorobenzene or ortho-dichlorobenzene, can be employed. The most preferred diluent is n-hexane. Prior to use, the diluent should be purified, such as by percolation through silica gel and/or molecular sieves, to remove traces of water, oxygen, polar compounds, and other materials capable of adversely affecting catalyst activity. The magnesium-containing dry, free-flowing powder is reacted with one or more transition metal compound(s) at a temperature and for a time sufficient to yield a solid catalyst component. Temperatures at which this reaction is conducted range from about −40° to about 250° C., preferably, from about 0° to about 170° C., and most preferably, the reaction is conducted at a temperature of 25°–100° C. Suitable reaction times range from about ½ to about 25 hours, with about ½ to about 6 hours being preferred.

The reaction of the transition metal in the liquid medium diluent with the magnesium-containing carrier material conveniently takes place by slurrying the solid carrier in a solution of the transition metal compound in the diluent and heating the liquid reaction medium to a suitable reaction temperature, e.g., to the reflux temperature of the diluent at standard atmospheric pressure.

Thus, the reaction usually takes place under reflux conditions.

The various reaction parameters can be widely varied, suitable selection of such parameters being well within the skill of those having ordinary skill in the art. The volume of the transition metal compound solution added to the magnesium-containing powder initially slurried in the solution is from about 0.1 to about 10 mililimiters (mls) per gram of such carrier. The concentration of the transition metal compound solution is, for example, from about 0.1 to about 5 Molar. It is important, however, that the molar amount of the transition metal compound in the solution is such that the molar ratio of the transition metal to magnesium (Mg) is about 0.3 to about 0.9, preferably about 0.4 to about 0.8, and most preferably about 0.5 to about 0.8. It is also believed, without wishing to be bound by any theory of operability, that the transition metal:Mg molar ratios outside of this range would produce a catalyst composition which, when used to polymerize alpha-olefins, would yield polymers having lower than desired values of $I_2$ and higher than desired values of MFR.

To assure that most, if not all, of the transition-metal-containing compound(s) are retained in the product of the last catalyst synthesis step, the liquid medium diluent is removed from the reaction vessel with care to assure that none or very little of the transition-metal containing compounds(s) are removed with it. The liquid medium diluent may be removed by any means assuring that substantially all of the transition-metal-containing compound(s) remain on the carrier, e.g., by distillation of the mixture of the liquid medium diluent and the solid reaction product, evaporation, decantation or centrifiguration. Evaporation at about the boiling point of the liquid medium diluent is the most preferred method of the liquid medium diluent removal. It is also important that the product of the fourth synthesis step is not subjected to washing or rinsing to avoid inadvertent removal of any transition-metal-containing compound(s) therefrom.

The lack of the washing or decantation steps, usually present in prior art (e.g., see Nowlin et al, U.S. Pat. No. 4,481,301), assures that substantially all of the transition metal compound(s) present in the liquid medium diluent in step (iv) are retained on the final catalyst composition. The resulting catalyst composition produces polymers having relatively high melt index values and relatively low MFR values, as compared to the aforementioned catalyst compositions of Nowlin et al. The lack of the washing or decantation steps also eliminates the potentially dangerous transition-metal-containing waste products.

As indicated above, the catalyst of the present invention are prepared in the substantial absence of water, oxygen, and other catalyst poisons. Such catalyst poisons can be excluded during the catalyst preparation steps by any well known methods, e.g., by carrying out the preparation under an atmosphere of nitrogen, argon or other inert gas. An inert gas purge can serve the dual purpose of excluding external contaminants during the preparation and removing undesirable reaction by-products resulting from the preparation of the neat, liquid reaction product. Purification of any diluent employed in the second and fourth preparative steps in the manner described above also is helpful in this regard.

The thus-formed supported catalyst may be activated with suitable activators also known as co-cocatalysts or catalyst promoters. The activators are known in the art and they include any of the materials commonly employed as promoters for olefin polymerization catalyst components containing compounds of the Group IB, IIA, IIB, IIIB and IVB of the Periodic Chart of the Elements, published by Fisher Scientific Company, Catalog Number 5-702-10, 1978. Examples of such promoters are metal alkyls, hydrides, alkylhydrides, and alkylhalides, such as alkyllithium compounds, dialkylzinc compounds, trialkylboron compounds, trialkylaluminum compounds, alkylaluminum halides and hydrides, and tetraalkylgermanium compounds. Mixtures also can be employed. Specific examples of useful promoters include n-butyllithium, diethylzinc, di-n-propylzinc, triethylboron, triethylaluminum, triisobutylaluminum, tri-n-hexylaluminum, ethylaluminum dichloride, dibromide, and dihydride, isobutyl aluminum dichloride, dibromide, and dihydride, diethylaluminum chloride, bromide, and hydride, di-n-propylaluminum chloride, bromide, and hydride, diisobutylaluminum chloride, bromide, and hydride, tetramethylgermanium, and tetraethylgermanium. Organometallic promoters which are preferred for use according to this invention are Group IIIB metal alkyls and dialkylhalides having 1 to about 20 carbon atoms per alkyl radical. More preferably, the promoter is a trialkylaluminum compound having 1 to about 6 carbon atoms per alkyl radical.

The organometallic promoter is employed in an amount which is at least effective to promote the polymerization activity of the solid component of the catalyst of this invention. Preferably, at least about three parts by weight of promoter are employed per part, by weight, of solid catalyst component, although higher ratios, such as 10:1, 25:1, 100:1 or higher are also suitable and often given highly beneficial results. In slurry polymerization processes, a portion of the promoter can be employed to pretreat the polymerization medium if desired. Other promoters which can be used herein are disclosed in Stevens et al, U.S. Pat. No. 3,787,384, column 4, line 45 to column 5, line 12, and in Strobel et al, U.S. Pat. No. 4,148,754, column 4, line 56 to column 5, line 59, the entire contents of both patents being incorporated herein by reference. The most preferred activator is triethylaluminum.

The catalyst may be activated in situ by adding the activator and catalyst separately to the polymerization medium. It is also possible to combine the catalyst and activator before the introduction thereof into the polymerization medium, e.g., for up to about 2 hours prior to the introduction thereof into the polymerization medium at a temperature of from about $-40°$ to about $100°$ C.

A suitable activating amount of the activator may be used to promote the polymerization activity of the catalyst. The aforementioned proportions of the activator can also be expressed in terms of the number of moles of activator per gram atom of transition metal in the catalyst of, e.g., from about 1 to about 100 and preferably greater than about 5.

Alpha-olefins may be polymerized with the catalysts prepared according to the present invention by any suitable process. Such processes include polymerizations carried out in suspension, in solution or in the gas phase. Gas phase polymerization reactions are preferred, e.g., those taking place in stirred bed reactors and, especially, fluidized bed reactors.

The molecular weight of the polymer may be controlled in a known manner, e.g., by using hydrogen. With the catalysts produced according to the present invention, molecular weight may be suitably controlled with hydrogen when the polymerization is carried out at relatively low temperatures, e.g., from about 30° to about 105° C. This control of molecular weight may be evidenced by a measurable positive change in melt index ($I_2$) of the polymer produced.

The molecular weight distribution of the polymers prepared in the presence of the catalysts of the present invention, as expressed by the melt flow ratio (MFR) values, varies from about 20 to about 32 for LLDPE products having a density of about 0.900 to about 0.940, and an $I_2$ melt index of about 4 to about 100. As is known to those skilled in the art, such MFR values are indicative of a relatively narrow molecular weight distribution of the polymer. As is also known to those skilled in the art, such MFR values are indicative of the polymers especially suitable for injection molding applications since the polymers having such MFR values exhibit relatively low amounts of warpage and shrinkage on cooling of the injection molded products. The relatively low MFR values of the polymers prepared with the catalysts of this invention also indicate that they are suitable for the preparation of various film products since such films are likely to have excellent strength properties. MFR is defined herein as the ratio of the high load melt index (HLMI or $I_{21}$) divided by the melt index ($I_2$), i.e., $$MFR = I_{21}/I_2$$

Smaller MFR values indicate relatively narrower molecular-weight distribution polymers.

The catalysts prepared according to the present invention are highly active and may have an activity of at least about 500–10,000 grams of polymer per gram of catalyst per 100 psi of ethylene in about 3 hours.

The linear polyethylene polymers prepared in accordance with the present invention may be homopolymers of ethylene or copolymers of ethylene with one or more $C_3$–$C_{10}$ alpha-olefins. Thus, copolymers having two monomeric units are possible as well as terpolymers having three monomeric units. Particular examples of such polymers include ethylene/1-butene copolymers, ethylene/1-hexene copolymers, ethylene/1-octene copolymers, ethylene/4-methyl-1-pentene copolymers, ethylene/1-butene/1-hexene terpolymers, ethylene/propylene/1-hexene terpolymers and ethylene/propylene/1-butene terpolymers. When propylene is employed as a comonomer, the resulting linear low density polyethylene polymer preferably has at least one other alpha-olefin comonomer having at least four carbon atoms in an amount of at least 1 percent by weight of the polymer. Accordingly, ethylene/propylene copolymers are possible, but not preferred. The most preferred comonomer is 1-hexane.

The linear low density polyethylene polymers produced in accordance with the present invention preferably contain at least about 80 percent by weight of ethylene units.

A particularly desirable method for producing linear low density polyethylene polymers according to the present invention is in a fluid bed reactor. Such a reactor and means for operating it are described by Levine et al, U.S. Pat. No. 4,011,382, and Karol et al, U.S. Pat. No. 4,302,566, the entire contents of both of which being incorporated herein by reference, and by Nowlin et al, U.S. Pat. No. 4,481,301.

The following Examples further illustrate the essential features of the invention. However, it will be apparent to those skilled in the art that the specific reactants and reaction conditions used in the Examples do not limit the scope of the invention.

EXAMPLE 1

(Synthesis of Inventive Catalyst Composition)

All procedures were carried out in glass or quartz equipment under purified nitrogen using predried nitrogen-purged solvents.

Catalyst Preparation

First Step:

30.36 grams of Davison silica gel Grade 955 (a trademark of and available from the Davison Chemical Division of W. R. Grace and Company, Baltimore, Md.) heated at 800° C. in the atmosphere of dry nitrogen for twelve hours, was placed into 500 ml flask under a slow nitrogen purge. Approximaely 275 ml of hexane was added while stirring and the contents were heated to reflux. 18.2 ml of a 2.1 molar solution of ethylmagnesium chloride in tetrahydrofuran (THF) was added dropwise to the refluxing solution, while the solution was stirred. The reflux was continued for one hour.

Second Step

The solvents were removed by distillation at 65° C. for 60 minutes.

Third Step

The product was dried at 80° C. for about 18 hours in nitrogen atmosphere. Yield: 36.41 grams; Mg=1.06 mmols/gram; THF=0.694 mmoles/gram (5% by weight); Cl=1.08 mmols/gram.

Fourth Step 10.07 grams of the product from the first step (10.67 mmols Mg) was placed into a 500 ml flask under a slow nitrogen purge. 100 ml of hexane containing 0.6 ml of TiCl$_4$ (5.46 mmols Ti) was added to the flask and the slurry was heated to reflux for about 2 hours. The solvent was removed by distillation and the product was dried overnight at 60° C. in nitrogen atmosphere. Yield: 8.89 grams of product which analyzed as follows: Mg=0.86 mmols/gram; Ti=0.48 mmols/gram; Cl=2.57 mmols/gram; THF=0.49 mmols/gram.

EXAMPLES 2–3

(Synthesis of Inventive Catalyst Compositions)

Additional catalysts were prepared in accordance with the procedure of Example 1, except that the TiCl$_4$/Mg mole ratio was varied in the fourth step. The TiCl$_4$/Mg mole ratio and the calculated amount of Mg in the final catalyst product (expressed in terms of milimoles per gram of product) for respective examples are summarized in Table I, below.

TABLE I

| Catalyst of Example | Fourth Step TiCl$_4$/Mg | Calculated Magnesium Content (mmols/gm) | Amount of THF in Product of Step (iii) (% wt.) |
|---|---|---|---|
| 1 | 0.7 | 0.9 | 4.5 |
| 2 | 0.3 | 0.9 | 4.5 |
| 3 | 0.5 | 0.86 | 5.0 |

COMPARATIVE EXAMPLES A AND B

Two more catalyst samples, prepared substantially in accordance with the teachings of Nowlin et al, U.S. Pat. No. 4,481,301, were used in comparative testing as discussed in Examples summarized below. These catalysts are referred to herein as "Comparative A or B" catalysts or simply as "A or B" catalysts, respectively.

First Step:

30.36 grams of Davison silica gel, Grade 955 (dried at 800° C. for 16 hours) was placed into a 500 ml four-neck reaction flask fitted with a dropping funnel, water condenser, dry nitrogen line, and overhead stirrer. Under a slow nitrogen purge, 275 ml of dry hexane was added to the silica while stirring. The silica/hexane slurry was brought to the reflux temperature and 18.2 ml of 2.1 molar ethylmagnesium chloride in THF (EtMgCL/THF) solution was added dropwise (about 8 minutes) and the reflux was continued for an additional 60 minutes. After this time, the solvents were removed by distillation and the silica dried at 80° C. under a nitrogen purge. Product yield: 36.41 grams; Mg conent: 1.06 mmols/gm; THF: 0.69 mmols/gram (5% by weight); Cl: 1.08 mmols/gram.

Second Step:

10.02 grams of the product from the first step (10.62 mmols Mg) was placed into a 500 ml flask under a slow nitrogen purge. 100 ml of hexane containing 4.4 ml of TiCl4 (40.06 mmols Ti) was added to the flask and the slurry was heated to reflux for about 2 hours. The slurry was transferred to a filter apparatus, filtered while at 60° C., and washed with 500 ml of dry hexane to remove excess TiCl4. Yield: 9.96 grams of product which analyzed as follows: Mg: 0.97 mmols/gram; Ti: 0.60 mmols/gram; Cl: 3.25 mmols/gram; THF: 0.43 mmols/gram.

The catalyst of comparative Example B was prepared in substantially the same manner as the comparative A catalyst, except that the molar Ti:Mg ratio in the second step was 4.0.

COMPARATIVE EXAMPLES C-1 THROUGH C-8

Eight more catalyst samples, prepared substantially in accordance with the teachings of Nowlin et al, U.S. Pat. No. 4,481,301, were used in comparative testing as discussed in Examples summarized below. In the synthesis of these catalysts, a greater amount of THF was left in the product of the first synthesis step of catalysts C-1 and C-2 than in comparative A and B catalysts or in the Examples 1-3 catalysts. The THF content was progressively reduced in the product of the first synthesis step to prepare catalysts C-3 through C-8. These catalysts are referred to herein as "Comparative C-1 through C-8" catalysts or simply as "C-1 through C-8" catalysts.

First Step:

94.5 grams of Davison silica gel, Grade 952 (dried at 800° C. for 16 hours) was placed into a 2 liter four-neck reaction flask fitted with a dropping funnel, water condenser, dry nitrogen line, and overhead stirrer. Under a slow nitrogen purge, 950 ml of dry hexane was added to the silica while stirring. The silica/hexane slurry was brought to the reflux temperature, 60 ml of 1.85 molar ethylmagnesium chloride in THF (EtMgCl/THF) solution was added dropwise (about 8 minutes) and the reflux was continued for an additional 60 minutes. After this time, the solvents were removed by distillation and the silica dried for 1.5 hours at 80° C. under a nitrogen purge. Product yield: 108 grams; Mg content (Theory): 1.03 mmols/gm.

Eight separate samples of this product were dried under increasingly more severe conditions to remove various amounts of THF, as summarized in Table A, below.

TABLE A

| Sample | Drying Conditions | THF Content (wt %) |
|--------|-------------------|--------------------|
| A001 | 1.5 Hrs. at 80° C. | 6.1 |
| A002 | 3.0 Hrs. at 80° C. | 5.2 |
| A003 | 7.5 Hrs. at 80° C. | 4.6 |
| A004 | 18.5 Hrs. at 80° C. | 4.2 |
| A005 | 18.5 Hrs. at 80° C. and 4 Hrs. at 80° C. under vacuum | 4.2 |
| A006 | 18.5 Hrs. at 80° C. and 30 Hrs. at 100° C. | 3.7 |
| A007 | 18.5 Hrs. at 80° C. and 30 Hrs. at 120° C. | 3.4 |
| A008 | 18.5 Hrs. at 80° C. and 30 Hrs. at 140° C. | 2.8 |

Second Step:

The products of the first step were then reacted with TiCl4 in the second step, exemplified here for the first step product of sample A001, to prepare eight catalyst samples C-1 through C-8.

6.48 grams of sample A001 from the first step (6.67 mmols Mg) was placed into a 300 ml flask under a slow nitrogen purge. 63 mls of heptane containing 3.15 ml of TiCl4 (28.7 mmols Ti) was added to the flask and the slurry was heated to reflux for about one hour. The slurry was transferred to a filter apparatus, filtered at about 70° C., and washed with 500 ml of dry hexane to remove excess TiCl4 and produce the C-1 catalyst. Yield: 6.69 grams of product which analyzed as follows: Mg (Theory): 0.99 mmols/gram; THF: 0.85 mmols/gram (6.1 wt. %). Seven additional catalysts, C-2 through C-8, were prepared from the products of the first step, designated A002 through A008, respectively, in substantially the same manner as the C-1 catalyst.

EXAMPLES 4–20

(Preparation of LLDPE Products)

Linear low density polyethylene products were prepared in a 1.6 liter autoclave. In a typical experiment (Example 8), the autoclave was heated under a nitrogen purge to about 90° C. for one-half hour and then cooled to ambient temperature. About 1,000 mls of hexane, and 135 grams of 1-hexene and 2.0 ml of triethylaluminum (25% weight solution in hexane) were added while stirring at about 900 rpm. (The total volume of hexane and hexene was about 1.2 liter in each experiment.) The catalyst was prepared by adding about 0.060 grams of the catalyst of Example 3 to a dry, nitrogen blanketed stainless steel catalyst addition flask containing about 50 ml of dry hexane. The reactor was closed, heated to 50° C. and the internal pressure was increased to 31 psi with hydrogen. The reactor temperature was increased to about 66° C. and ethylene was introduced at 120 psi total pressure. After the autoclave was filled with ethylene, the contents of the catalyst addition flask were added with a slight ethylene pressure to the autoclave.

The ethylene flow was monitored through a Hastings Mass Flowmeter NALL-50 KG/CC-420 interfaced with a strip chart recorder to record ethylene flow (gms/minute) as a function of time (minutes).

At the end of the polymerization time, about 30 minutes, the autoclave was cooled to room temperature, opened and the contents placed in a large container. About 300 ppm of Irganox 1076 was added as a hexane solution and volatiles allowed to evaporate under a hood. Polymer yield was about 163 grams.

Figure 1:
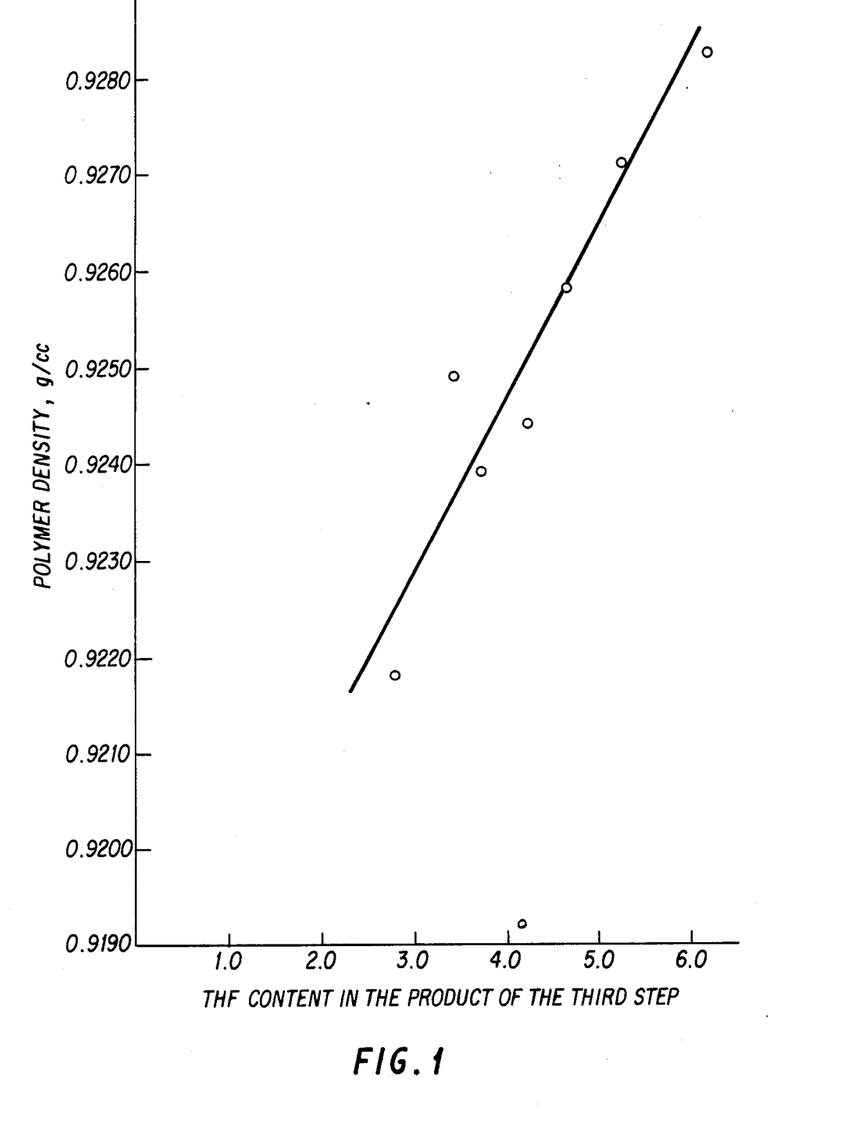
FIG. 1 is a graphical representation of the effect of tetrahydrofuran (THF) content on the density of polymers produced wih the catalysts of Examples C-1 through C-8.
Figure 2:
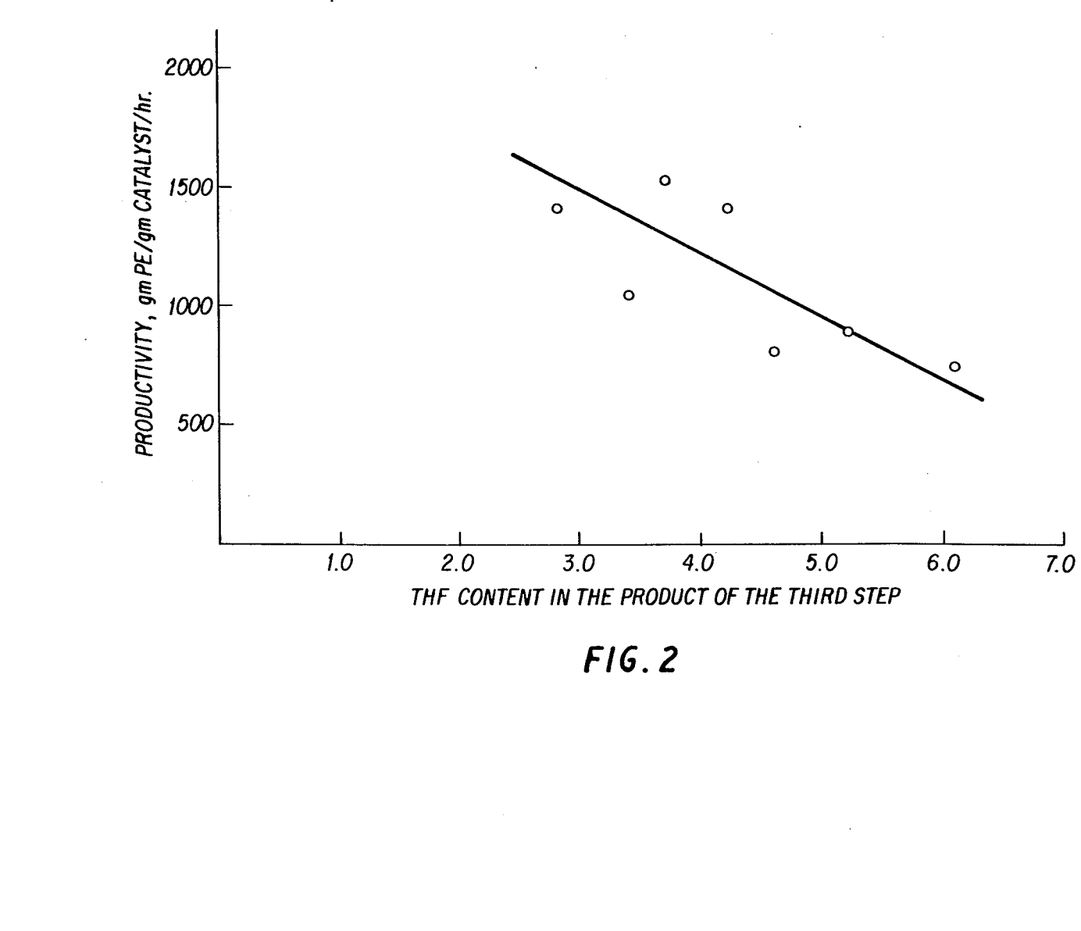
FIG. 2 is a graphical representation of the effect of THF content on the productivity of catalysts of Examples C-1 through C-8.

Tables II and IIC summarize the polymerization conditions and properties of the products. Additionally, the data of Table IIC is presented graphically in FIGS. 1 and 2.

The term "hexane extractables" is used herein to define the amount of a polymer sample extracted by refluxing

TABLE II
SUMMARY OF LLDPE PRODUCTS

| Example No. | Catalyst Of Example | Catalyst (grs) | Reaction Ti/Mg Mole Ratio | Co-monomer Type | $C_n/C_2$ | Polymerization Time (minutes) | Polymer Yield (gms) | Productivity gm PE/gm cat./hr. | $I_2$ | $(I_{21})$ | MFR $(I_{21}/I_2)$ | *Density corrected (gms/cc) |
|---|---|---|---|---|---|---|---|---|---|---|---|---|
| 4 | 1 | 0.050 | 0.7 | 1-Hexene | 1.76 | 45 | 141 | 3760 | 8.20 | 246.0 | 30.0 | 0.925 |
| 5 | 1 | 0.052 | 0.7 | 1-Hexene | 1.76 | 45 | 152 | 3897 | 10.80 | 322.0 | 29.8 | 0.922 |
| 6 | 2 | 0.052 | 0.3 | 1-Hexene | 1.76 | 45 | 56 | 1436 | 8.10 | 245.0 | 30.2 | 0.931 |
| 7 | 2 | 0.054 | 0.3 | 1-Hexene | 1.76 | 45 | 64 | 1580 | 5.90 | 198.0 | 33.5 | 0.929 |
| 8 | 3 | 0.060 | 0.5 | 1-Hexene | 1.91 | 30 | 163 | 5433 | 6.23 | 186.4 | 29.9 | 0.922 |
| 9 | 3 | 0.037 | 0.5 | 1-Hexene | 1.91 | 40 | 131 | 5284 | 4.01 | 116.9 | 29.1 | 0.924 |
| 10 | A | 0.026 | 3.8 | 1-Hexene | 1.91 | 65 | 127 | 4523 | 2.14 | 73.7 | 34.4 | 0.920 |
| 11 | B | 0.057 | 4.0 | 1-Hexene | 1.91 | 60 | 147 | 2579 | 1.57 | 54.9 | 34.8 | 0.924 |
| 12 | B | 0.065 | 4.0 | 1-Hexene | 1.91 | 35 | 175 | 4642 | 1.93 | 68.4 | 35.4 | 0.922 |

*Densities were corrected to an $I_2$ melt index value of 1.0 according to the method of Elston, U.S. Pat. No. 3,645,992, the entire contents of which are incorporated herein by reference.

TABLE IIC
SUMMARY OF LLDPE PRODUCTS

| Example No. | Catalyst Of Example | Catalyst (grs) | THF Content In First Step Product (wt %) | Reaction Ti/Mg Mole Ratio | Comonomer Type | $C_n/C_2$ | Polymerization Time (minutes) |
|---|---|---|---|---|---|---|---|
| 13 | C-1 | 0.146 | 6.1 | 4.3 | 1-Hexene | 1.42 | 120 |
| 14 | C-2 | 0.110 | 5.2 | 4.3 | 1-Hexene | 1.42 | 120 |
| 15 | C-3 | 0.149 | 4.6 | 4.3 | 1-Hexene | 1.42 | 129 |
| 16 | C-4 | 0.092 | 4.2 | 4.3 | 1-Hexene | 1.42 | 47 |
| 17 | C-5 | 0.101 | 4.2 | 4.3 | 1-Hexene | 1.42 | 28 |
| 18 | C-6 | 0.105 | 3.7 | 4.3 | 1-Hexene | 1.42 | 79 |
| 19 | C-7 | 0.186 | 3.4 | 4.3 | 1-Hexene | 1.42 | 66 |
| 20 | C-8 | 0.208 | 2.8 | 4.3 | 1-Hexene | 1.42 | 56 |

| Example No. | Polymer Yield (gms) | Productivity (gm PE/gm cat./hr) | $I_2$ | $I_{21}$ | MFR $(I_{21}/I_2)$ | *Density corrected (gms/cc) |
|---|---|---|---|---|---|---|
| 13 | 229 | 785 | 1.37 | 45.0 | 32.9 | 0.9282 |
| 14 | 203 | 920 | 2.55 | 85.6 | 33.6 | 0.9271 |
| 15 | 269 | 840 | 2.80 | 90.8 | 32.4 | 0.9258 |
| 16 | 103 | 1430 | 2.51 | 86.5 | 34.5 | 0.9190 |
| 17 | 151 | 3200 | 2.07 | 69.8 | 33.7 | 0.9244 |
| 18 | 214 | 1545 | 3.04 | 99.4 | 32.7 | 0.9239 |
| 19 | 216 | 1055 | 2.11 | 71.3 | 33.8 | 0.9249 |
| 20 | 274 | 1410 | 2.98 | 103 | 34.6 | 0.9218 |

*Densities were corrected to an $I_2$ melt index value of 1.0 according to the method of Elston, U.S. Pat. No. 3,645,992.
**Conditions: 1.0 liter hexane, 80° C., 90 grams 1-hexene, 900 rpm, total pressure 140 psi.

The data of Table II illustrates that the use of such amounts of a tetravalent titanium compound that the molar ratio of Ti:Mg in the fourth synthesis step is about 0.3 to about 0.9 produces catalyst compositions which polymerize polymers having melt flow ratio values of about 30.5±1.5. In contrast, comparative catalyst compositions A and B, prepared with a molar excess of titanium with respect to magnesium, produce polymers having higher melt flow ratios of about 34.8±0.4, suggesting a broader molecular weight distribution.

The polymerization data of Comparative Example C-1 through C-8 (Examples 13-20) illustrates that the removal of substantially all of the liquid solvent used in the first synthesis step is crucial to the preparation of polymers having relatively low densities and better productivity.

As is known to those skilled in the art, polymers having lower MFR values usually exhibit better mechanical properties and lower hexane extractables which renders the more suitable for applications requiring FDA (Food and Drug Administration) approval. The term "hexane extractables" is used herein to define the amount of a polymer sample extracted by refluxing the sample in hexane in accordance with the FDA-approved procedure. As is known to those skilled in the art, the FDA requires that all polymer products having food contact contain less than 5.5% by weight of such hexane extractables.

The data also illustrates that the substantially complete removal of the liquid solvent of the first synthesis step and subsequent use of stoichiometric or smaller amounts of titanium (i.e., Ti:Mg molar ratio of about 0.3 to about 0.9) produces catalysts having comparative activity and higher alpha-olefin incorporation properties (as evidenced by the low density of copolymers—Examples 4-9 and 13-20) than similar catalysts prepared with a stoichiometric excess of titanium (Ti:Mg molar ratios of greater than one—Examples 10-12). The use of smaller amounts of Ti simplifies the catalyst synthesis procedure, insofar as the necessity of washing excess titanium is eliminated and no potentially toxic titanium-containing waste is generated.

It will be apparent to those skilled in the art that the specific embodiments discussed above can be successfully repeated with ingredients equivalent to those generically or specifically set forth above and under variable process conditions.

From the foregoing specification, one skilled in the art can readily ascertain the essential features of this invention and without departing from the spirit and scope thereof can adapt it to various diverse applications.

We claim:

1. A process for preparing a supported catalyst composition for use in alpha-olefin polymerization reactions comprising the steps of:
    (i) contacting a solid, porous carrier having reactive OH groups with a liquid containing at least one organomagnesium composition having the empirical formula:

$R_nMgR'_{(2-n)}$ where R and R' are the same or different and they are $C_1$-$C_{12}$ hydrocarbyl groups, provided that R' may also be a halogen and n is 0, 1, or 2, the number of moles of said organomagnesium composition being in excess of the number of moles of said OH groups on said carrier, whereby said organomagnesium composition is reacted with said OH groups on said carrier;
    (ii) removing said liquid from step (i), whereby a supported magnesium (Mg) composition in the form of a solid powder is formed;
    (iii) drying said solid powder, without washing, rinsing or decantation of the product of step (ii), until it comprises not more than about 6% by weight of the liquid;
    (iv) reacting the product of step (iii) with a solution of a non-polar solvent containing at least one transition metal compound soluble in the non-polar solvent, the number of moles of said transition metal compound being such that the molar ratio of the transition metal to magnesium (Mg) is about 0.3 to about 0.9, both the transition metal and Mg being calculated as elemental metals, said supported magnesium composition being substantially insoluble in said non-polar solvent, whereby a reacted form of transition metal which is insoluble in said non-polar solvent becomes supported on said carrier; and
    (v) removing the non-polar solvent without washing, rinsing or decantation of the product of step (iv).

2. A process of claim 1 wherein said drying is conducted until the solid powder comprises less than about 5% by weight of the liquid.

3. A process of claim 2 wherein said drying is conducted until the solid powder comprises about 2% to about 5% by weight of the liquid.

4. A process of claim 3 wherein the molar ratio of the transition metal to Mg in step (iv) is about 0.4 to about 0.8.

5. A process of claim 4 wherein the molar ratio of the transition metal to Mg in step (iv) is about 0.5 to about 0.8.

6. A process of claim 5 wherein n is 1.

7. A process of claim 6 wherein step (i) comprises:
    (a) slurrying the carrier in a non-Lewis base liquid; and
    (b) adding to the slurry resulting from step (a) the organomagnesium composition in the form of an ether solution thereof.

8. A process of claim 7 wherein the ether is tetrahydrofuran.

9. A process of claim 8 wherein the porous, solid carrier is silica, alumina or combinations thereof.

10. A process of claim 9 wherein the porous, solid carrier is silica.

11. A process of claim 10 wherein the transition metal compound is a tetravalent titanium compound.

12. A process of claim 11 wherein the tetravalent titanium compound is $TiCl_4$.

13. A process of claim 12 wherein, in step (i), the ratio of the number of moles of said organomagnesium composition to the number of moles of the OH groups on said silica is from about 1.1 to about 3.5.

14. A process of claim 13 wherein, in step (i), the ratio of the number of moles of said organomagnesium composition to the number of moles of the OH groups on said silica is from about 1.5 to about 3.5.

15. A process of claim 14 wherein, in step (i), the ratio of the number of moles of said organomagnesium composition to the number of moles of the OH groups on said silica is from about 2.0 to about 3.5.

16. A process of claim 15 wherein the tetrahydrofuran is evaporated in step (ii) at about 75° to about 90° C. for about 12 to about 20 hours.

17. A process of claim 16 wherein the tetrahydrofuran is evaporated at about 80° to about 85° C. for about 16 hours in a dry nitrogen atmosphere.

18. A process of claim 17 wherein, subsequently to step (iv), said non-polar solvent is evaporated at about 75° to about 90° C. for about 12 to about 20 hours.

19. A process of claim 18 wherein said non-polar solvent is evaporated at about 80° to about 85° C. for about 16 hours in a dry nitrogen atmosphere.

20. A process of claim 19 wherein said non-polar solvent is an alkane, cycloalkane, aromatics, halogenated aromatics or hydrogenated aromatics.

21. A process of claim 20 wherein said non-polar solvent is hexane.

22. A process of claim 21 wherein, prior to contacting the silica in step (i), it is heated at a temperature of about 750° C. to about 850° C. for at least four hours.

23. A process of claim 22 wherein the organomagnesium composition is ethylmagnesium chloride.

24. A supported catalyst composition for use in alpha-olefin polymerization reactions, prepared by a process comprising the steps of:
    (i) contacting a solid, porous carrier having reactive OH groups with a liquid containing at least one organomagnesium composition having the empirical formula:

$R_nMgR'_{(2-n)}$ where R and R' are the same or different and they are $C_1$-$C_{12}$ hydrocarbyl groups, provided that R' may also be a halogen and n is 0, 1, or 2, the number of moles of said organomagnesium composition being in excess of the number of moles of said OH groups on said carrier, whereby said organomagnesium composition is reacted with said OH groups on said carrier;
    (ii) removing said liquid from step (i), whereby a supported magnesium (Mg) composition in the form of a solid powder is formed;
    (iii) drying said solid powder, without washing, rinsing or decantation of the product of step (ii), until it comprises not more than about 6% by weight of the liquid;

(iv) reacting the product of step (iii) with at least one transition metal compound in a non-polar solvent, the number of moles of said transition metal compound being such that the molar ratio of the transition metal to magnesium (Mg) is about 0.3 to about 0.9, both the transition metal and Mg being calculated as elemental metals, said transition metal compound being soluble in said non-polar solvent and said supported magnesium composition being substantially insoluble in said non-polar solvent, whereby a reacted form of transition metal which is insoluble in said non-polar solvent becomes supported on said carrier; and (v) removing the non-polar solvent without washing, rinsing or decantation of the product of step (iv).

25. A catalyst composition of claim 24 wherein said drying is conducted until the powder comprises less than about 5% by weight of the liquid.

26. A catalyst composition of claim 25 wherein said drying is conducted until the powder comprises about 2% to aout 5% by weight of the liquid.

27. A catalyst composition of claim 26 wherein the molar ratio of the transition metal to Mg in step (iv) is about 0.4 to about 0.8.

28. A catalyst composition of claim 27 wherein the molar ratio of the transition metal to Mg in step (iv) is about 0.5 to about 0.8.

29. A catalyst composition of claim 28 wherein n is 1.

30. A catalyst composition of claim 29 wherein step (i) comprises:
(a) slurrying the carrier in a non-Lewis base liquid; and
(b) adding to the slurry resulting from step (a) the organomagnesium composition in the form of an ether solution thereof.

31. A catalyst composition of claim 30 wherein the ether is tetrahydrofuran.

32. A catalyst composition of claim 31 wherein the porous, solid carrier is silica, alumina or combinations thereof.

33. A catalyst composition of claim 32 wherein the porous, solid carrier is silica.

34. A catalyst composition of claim 33 wherein the transition metal compound is a tetravalent titanium compound.

35. A catalyst composition of claim 34 wherein the tetravalent titanium compound is $TiCl_4$.

36. A catalyst composition of claim 35 wherein, in step (i), the ratio of the number of moles of said organomagnesium composition to the number of moles of the OH groups on said silica is from about 1.1 to about 3.5.

37. A catalyst composition of claim 36 wherein, in step (i), the ratio of the number of moles of said organomagnesium composition to the number of moles of the OH groups on said silica is from about 1.5 to about 3.5.

38. A catalyst composition of claim 37 wherein, in step (i), the ratio of the number of moles of said organomagnesium composition to the number of moles of the OH groups on said silica is from about 2.0 to about 3.5.

39. A catalyst composition of claim 38 wherein the tetrahydrofuran is evaporated in step (ii) at about 75° to about 90° C. for about 12 to about 20 hours.

40. A catalyst composition of claim 39 wherein the tetrahydrofuran is evaporated at about 80° to about 85° C. for about 16 hours in a dry nitrogen atomsphere.

41. A catalyst composition of claim 40 wherein, subsequently to step (iv), said non-polar solvent is evaporated at about 75° to about 90° C. for about 12 to about 20 hours.

42. A catalyst composition of claim 41 wherein said non-polar solvent is evaporated at about 80° to about 85° C. for about 16 hours in a dry nitrogen atmosphere.

43. A catalyst composition of claim 42 wherein said non-polar solvent is an alkane, cycloalkane, aromatics, halogenated aromatics or hydrogenated aromatics.

44. A catalyst composition of claim 43 wherein said non-polar solvent is hexane.

45. A catalyst composition of claim 44 wherein, prior to contacting the silica in step (i), it is heated at a temperature of about 750° C. for at least four hours.

46. A catalyst composition of claim 45 wherein, prior to contacting the silica is step (i), it is heated at a temperature of about 750° C. to about 850° C. for at least four hours.

47. A process of claim 23 wherein in step (ii) said liquid is removed by evaporation at about the boiling point of the liquid.

48. A process of claim 47 wherein in step (iv) the molar ratio of the transition metal to magnesium is about 0.5 to about 0.7.

49. A process of claim 48 wherein in step (v) the non-polar solvent is removed by evaporation at about the boiling point thereof.

50. A catalyst composition of claim 46 wherein in step (ii) said liquid is removed by evaporation at about the boiling point of the liquid.

51. A catalyst composition of claim 50 wherein in step (iv) the molar ratio of the transition metal to magnesium is about 0.5 to about 0.7.

52. A catalyst composition of claim 51 wherein in step (v) the non-polar solvent is removed by evaporation at about the boiling point thereof.

* * * * *

UNITED STATES PATENT AND TRADEMARK OFFICE
CERTIFICATE OF CORRECTION

PATENT NO. : 4,677,087

DATED : June 30, 1987

INVENTOR(S) : Thomas E. Nowlin, Frederick Y. Lo and Margaret M. Wu

Page 1 of 2

It is certified that error appears in the above-identified patent and that said Letters Patent is hereby corrected as shown below:

Column 2, line 30, delete "raction" and insert --reaction--.

Column 4, line 56, delete "compositon" and insert --composition--.

Column 5, line 30, delete "powder. the" and insert --powder. The--.

Column 5, line 33, delete "then" and insert --than--.

Column 6, line 42, delete "octance" and insert --octane--.

Column 7, line 53, delete "catalyst" and insert --catalysts--.

Column 9, line 34, delete "given" and insert --give--.

Column 11, line 17, delete "conent" and insert --content--.

Column 13, line 67, delete "The" and insert --Them--.

Column 17, line 21, Claim 26, delete "aout" and insert --about--.

UNITED STATES PATENT AND TRADEMARK OFFICE
CERTIFICATE OF CORRECTION

PATENT NO. : 4,677,087

DATED : June 30, 1987

INVENTOR(S) : Thomas E. Nowlin et al

It is certified that error appears in the above-identified patent and that said Letters Patent is hereby corrected as shown below:

Column 18, line 16, Claim 40, delete "atomsphere" and insert --atmosphere--.

Signed and Sealed this

Fourth Day of July, 1989

Attest:

DONALD J. QUIGG

*Attesting Officer*     *Commissioner of Patents and Trademarks*